United States Patent Office 2,766,731
Patented Oct. 16, 1956

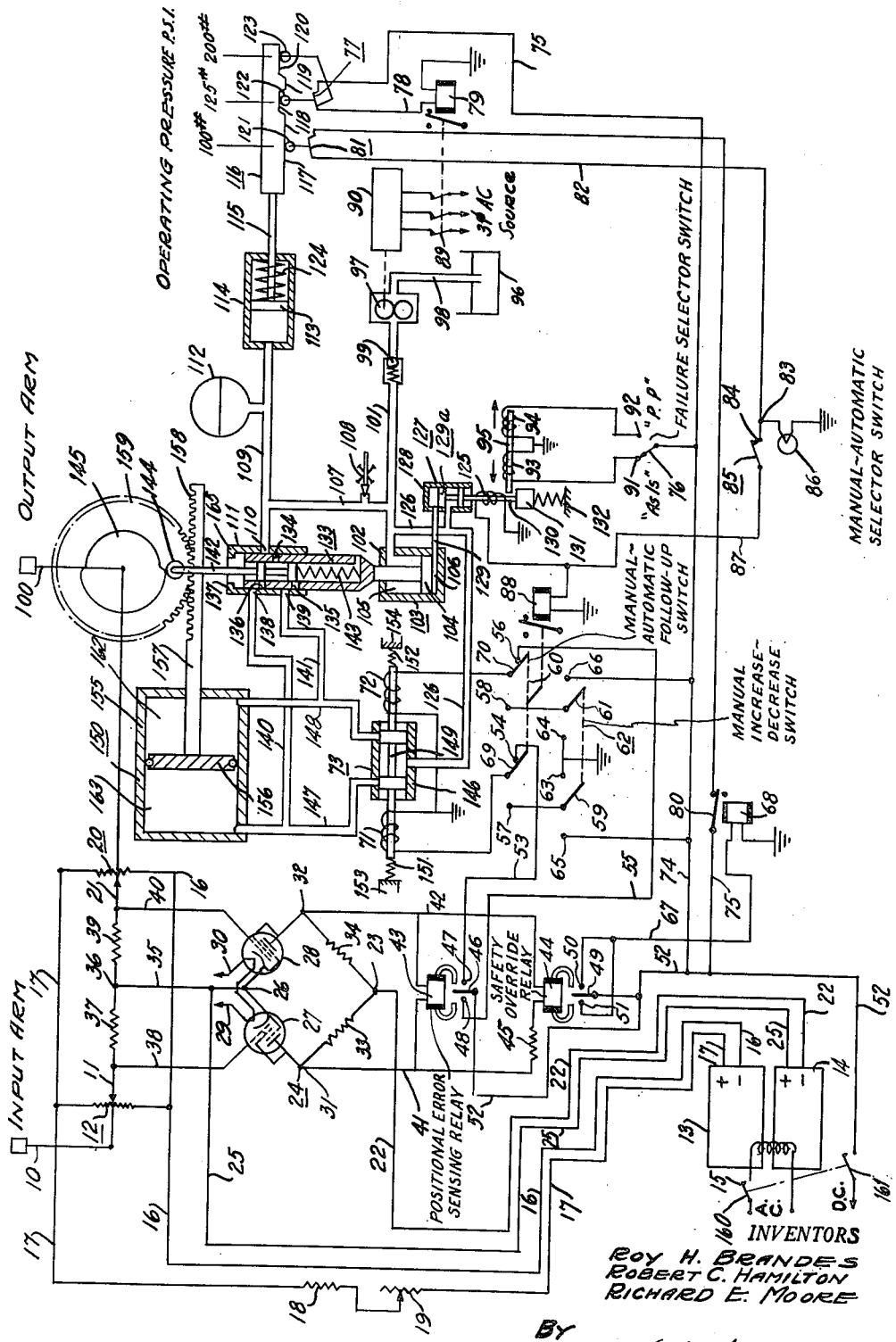

2,766,731

ELECTRICALLY CONTROLLED, FLUID PRESSURE OPERATED REMOTE POSITIONER

Roy H. Brandes, Dayton, Ohio, and Robert C. Hamilton, Pasadena, and Richard E. Moore, Los Angeles, Calif., assignors to General Motors Corporation, Detroit, Mich., a corporation of Delaware Application May 11, 1953, Serial No. 354,172

8 Claims. (Cl. 121—41)

The present invention pertains to remote positioners and more particularly to an electro-hydraulically operated remote positioner.

Present day aircraft employ remote positioners for divers applications. One of the most prominent and essential uses for remote positioners on aircraft, is in conjunction with the engine throttle control mechanism. However, remote positioners, like other intricate control systems, frequently develop malfunctions and failures. Accordingly, a remote positioner, to be acceptable for an aircraft, must include safety devices which will preclude the possibility of a mishap in the event of a partial or total failure. This invention provides a remote positioner wherein an actuator for positioning a load element, such as a throttle, may be automatically locked in an "as is" position or moved to a "predetermined position," and locked, upon a failure occurring in the positioner system. Accordingly, among our objects are the provision of a remote positioner having automatic and manual means for effecting movement of an output arm; a remote positioner including means operable to render the automatic system inoperative upon the existence of a predetermined positional difference between the input and output arms; and a remote positioner including an output arm actuator having means for locking the actuator upon the occurrence of a failure in the system and upon the completion of any desired adjustment.

The aforementioned and other objects accomplished in the present invention by providing a manually positionable input arm, an output arm, and means operable to effect movement of the output arm throughout the same distance as the input arm is moved manually. The output arm may be connected to any load element remotely displaced from the input arm, for example, an aircraft throttle. Specifically, the remote positioner includes an electrical impedance circuit for sensing positional errors between the input and output arms, the impedance network developing signals upon the manifestation of a positional error, which signals are applied to control and actuate a solenoid valve in a fluid pressure controlled actuator system for positioning the output arm. The impedance network comprises a D. C. bridge of conventional construction, one leg of which may be manually unbalanced by movement of the input arm. The existence of an unbalanced condition in the bridge causes a flow of current between the output terminals of the bridge, the direction and amount of the current being dependent upon the character and amount of positional error between the input and output arms. The output terminals of the bridge have connected across them in parallel, a pair of polarized, or current direction sensitive relays. One of the polarized relays is actuated by all unbalanced current flows between the output bridge terminals, while the other polarized relay only responds to unbalanced currents of a predetermined magnitude. The first relay will hereinafter be referred to as the positional error sensing relay and the second relay will hereinafter be referred to as the safety override relay.

The positional error sensing relay has terminals connected to the coils of a solenoid valve, and the safety override relay has terminals connected to a relay operable to render the automatic system of the remote positioner inoperative. The solenoid valve is connected by a conduit to a source of fluid pressure. The source of fluid pressure includes a motor driven pump, intermittently operated by a cam actuated micro-switch arrangement, and an accumulator. The outlet ports of the solenoid valve are connected to a fluid pressure operated actuator including a cylinder and piston, the piston of which is operably connected to the output arm for effecting movement thereof. The fluid pressure system employs oil as the actuating medium. Movement of the output arm by the actuator piston tends to rebalance the D. C. bridge which is unbalanced by movement of the input arm. Thus, the output arm is associated with a follow-up system which will restore balance to the D. C. bridge when the output arm has been moved throughout the same distance by the actuator, as the input arm was moved manually.

The electrical system associated with the remote positioner includes a failure selector switch, manually operable by the pilot. That is, the pilot can select the position in which the output arm is to remain locked in the event of a failure occurring in the fluid pressure system, such as a loss of fluid pressure, or a failure occurring in the electrical system. The failure selector switch has two positions, namely, an "as is" position and a "predetermined" position. When the failure selector switch is positioned for an "as is" failure the actuator is locked by trapping fluid in the cylinder at the position it is at the moment of failure. Since the output arm actuator is locked hydraulically the output arm will also be locked. However, when the pilot selects a "predetermined" position failure, the occurrence of a failure in the remote positioner will result in movement of the output arm to a predetermined position. The means for accomplishing the movement of an output arm after failure in the positioner system comprises a spring loaded valve which is released upon an electrical failure, to admit fluid under pressure to a servomotor that positions a control valve and admits fluid under pressure from the accumulator to the actuator cylinder to effect movement of the output arm. The control valve includes a follow-up piston actuated by movement of the output arm, and when the output arm reaches the predetermined position the flow of fluid under pressure from the accumulator into the actuator is cut off.

Upon the existence of a predetermined positional error between the input and output arm of the remote positioner, the safety override relay will be actuated and render the automatic control system inoperative. If this situation should arise, the output arm may be moved by manual actuation of a switch, if neither the electrical nor fluid pressure systems have been rendered totally inoperative.

Further objects and advantages of the present invention will be apparent from the following description, reference being had to the accompanying drawings, wherein a preferred form of the present invention is clearly shown.

In the drawing:

The drawing illustrates a schematic view of the remote positioner system.

With particular reference to the drawing, the remote positioner includes an input arm 10 and an output arm 100. The input arm 10 is manually movable and is operatively connected to and controls the position of a movable member 11 of a potentiometer 12. A pair of independent D. C. power supplies 13 and 14 are provided, these power supplies being of the full wave rectifier type with an RC type output smoothing filter, not shown, and illustrated in block form as being energized by an A. C. source 15. The negative terminal of power supply 13 is connected by a wire 16 to one terminal of the potentiometer 12. The positive terminal of power supply 13 is connected by wire 17 through a variable resistance 19 and a fixed resistance 18 to the other terminal of the potentiometer 12. The wire 17 also connects with one terminal of a second potentiometer 20, the movable member 21 of which is operatively connected to and positioned by the output arm 100. The other terminal of potentiometer 20 is connected to the negative terminal of power supply 13 by wire 16.

The negative terminal of power supply 14 is connected by wire 22 to an input terminal 23 of a D. C. bridge or impedance network 24. A positive terminal of power supply 14 is connected by a wire 25 to the second terminal 26 of the D. C. bridge. The D. C. bridge is of conventional configuration and employs pentode type vacuum tubes 27 and 28 in two legs thereof, which tubes amplify any bridge unbalance currents. Terminal 26 is connected to the cathodes of vacuum tubes 27 and 28, the cathodes in turn being connected to the suppressor grids of the tubes. The filaments 29 and 30 of the tubes 27 and 28 are connected to any suitable source of electric current, not shown. The screen grids and plates of the vacuum tubes 27 and 28 are interconnected and the plates of tubes 27 and 28 are respectively connected to output terminals 31 and 32 of the D. C. bridge 24. Output terminals 31 and 32 of the D. C. bridge are connected through resistors 33 and 34 of equal value to input terminal 23. Terminal 26 is connected by a wire 35 to the second input terminal 36 of the D. C. bridge. Input terminal 36 is connected by a wire through resistor 37 to member 11 of potentiometer 12, the movable member 11 being connected by wire 38 to the control grid of tube 27. Input terminal 36 is also connected by a wire through a resistor 39 to the movable member 21 of potentiometer 20, the ohmic values of resistors 37 and 39 being equal. Movable member 21 of potentiometer 20 is in turn connected by a wire 40 to the control grid of vacuum tube 28.

The D. C. bridge, in a conventional manner, is constituted by four legs. One leg of the bridge includes resistor 37, a portion of potentiometer 12 and the voltage amplifying vacuum tube 27. The second leg of the bridge is constituted by a resistor 33; a third leg of the bridge is constituted by a resistor 34 and a fourth leg of the bridge by a voltage amplifying vacuum tube 28, a portion of the potentiometer 20 and the resistor 39.

The output terminals 31 and 32 of the D. C. bridge 24 have connected thereto wires 41 and 42, across which polarized relays 43 and 44 are connected in parallel. Relay 44 has connected in series therewith a current limiting resistor 45, the purpose of which will later be apparent. Relay 43 actuates a positional error sensing relay having a movable armature 46 engageable with contacts 47 and 48. The positional error sensing relay is of the polarized type, that is the armature 46 moves in a direction determined by the direction of current flow through the coil of relay 43. For example, if current flows from wire 41 to wire 42, the armature 46 may be moved into engagement with contact 47, while if current flows in the reverse direction, the armature may be moved into engagement with contact 48. In a like manner the safety override relay 44 is of the polarized type. The safety override relay includes a movable armature 49 which may be moved into engagement with either of contacts 50 and 51. The movable armatures 46 and 49 of the relays are connected by a wire 52 to a 28 volt D. C. source, not shown. Contact 47 is connected by a wire 53 to a contact 54 of a manual-automatic follow-up switch 60. Contact 48 is connected by a wire 55 to a second contact 56 of the switch 60. The switch 60 includes another set of contacts 57 and 58 which are connected by suitable wires to the movable contact blades 59 and 61 of an increase-decrease switch 62. The switch 62 includes contacts 63 and 64 which are grounded, and contacts 65 and 66 which are connected by wires to the wire 52 and the 28 volt D. C. power supply, not shown. The contacts 50 and 51 of the safety override relay are interconnected and thence connected by a common land wire 67 to one terminal of a relay 68, the other terminal of which is connected to ground.

The movable switch blades 69 and 70 of the switch 60 are connected by wires to coils 71 and 72 respectively of a solenoid operated valve 73. The opposite ends of the coils 71 and 72 are connected by a common wire to ground. Wire 52, which is connected to a 28 volt D. C. power supply, has connected thereto a pair of wires 74 and 75. Wire 74 connects with the movable contact blade of a failure selector switch 76, and also connects with a terminal of a reset type micro-switch 77 of conventional construction. The movable contact blade of the reset micro-switch 77 is connected by a wire 78 through a relay 79 to ground. Wire 75 is connected through a relay operated switch 80 to the terminal of a second switch 81. Movable contact of the switch 81 is connected by a wire 82 to a terminal 83. The terminal 83 has branches connecting respectively with terminal 84 of a manually operable switch 85, and with one terminal of a pilot light 86, the other terminal of which is grounded. The contact blade of switch 85 is in turn connected by a wire 87 to one terminal of a relay 88, the other terminal of which is grounded. Relay 88 is employed to effect movement of switch blades 69 and 70 of the double pole, double throw switch 60. When the coil 88 is energized the blades 69 and 70 are maintained in engagement with contacts 54 and 56, respectively, as shown in the drawing. Relay 68 is employed to effect movement of a switch blade 80, the construction and arrangement being such that the switch 80 is closed whenever the relay 68 is de-energized. Relay 79 is employed to close a three pole switch 89, which when closed, connects a source of three phase alternating current, not shown, to the terminals of a motor 90 for energizing the same, when the relay 79 is energized. The movable contact of the failure selector switch 76 is engageable with either contact 91 or contact 92. Contact 91 is connected by wire to one terminal of a coil 93, the other terminal of which is grounded and terminal 92 is connected by a wire to a second coil 94, the other terminal of which is grounded. The coils 93 and 94 encompass a movable armature 95 which moves to the left to the position it is shown in the drawing when coil 93 is energized, and which moves to the right, as viewed in the drawing, when coil 94 is energized. Contact 91 will hereinafter be called the "as is" terminal and contact 92 will hereinafter be called the "predetermined position" terminal for a purpose which will later be apparent. Wire 87 also connects with one terminal of coil 125, the other terminal of which is grounded.

*Hydraulic system*

The hydraulic system includes a reservoir 96 containing a fluid medium, such as oil. A pump 97 driven by the motor 90 is employed to draw fluid through conduit 98 and increase the pressure thereof and thence discharge the fluid through a check valve 99 and into a conduit 101. The conduit 101 connects with the cylinder 102 of a servomotor 103 on one side of a piston 104 mounted for reciprocal movement in the cylinder. As is apparent by inspection of the drawing, the conduit 101 connects with the rod end of the piston 104 and thus the pressure existent chamber 105 of the cylinder 102 acts on a lesser area of the piston surface than does pressure that may be admitted to chamber 106 of the cylinder. Conduit 101 has a branch 107 having associated therewith a pressure relief valve 108, the conduit 107 connecting with conduit 109. The conduit 109 connects with the supply port 110 of a control valve 111; with the port of an accumulator 112; and with the inlet port of a cylinder 114 having a spring loaded pressure responsive piston 113 mounted therein. The piston 113 has a rod 115 which extends through an end wall of the cylinder 114 and is operatively connected with a cam 116. The cam 116 has a plurality of actuating surfaces 117, 118, 119 and 120. Associated with surface 117 is a cam follower 121 operatively connected to the movable switch blade of switch 81. Associated with surfaces 118, 119 and 120 of the cam 116 are a pair of cam followers 122 and 123 which are operatively connected to the movable blade of the reset type microswitch 77. The cam followers 121, 122 and 123 are located at positions representative of different predetermined pressure potentials existent in the conduit 109.

In the particular embodiment disclosed, if a pressure of 200 p. s. i. exists in the conduit 109, the piston 113 will compress its associated spring 124 by moving to the right as viewed in the drawing until cam follower 123 is moved into engagement with cam surface 120, as shown. When the cam follower 123 engages cam surface 120, the reset type micro-switch 77 is opened thereby deenergizing coil 79 which in turn allows switch 89 to open and the motor 90 ceases rotation. Thus, the pump 97 is not continuously driven and the flow required by the hydraulic system is supplied by the fluid stored in the accumulator 112 until the pressure existing in line 109 drops to 125 p. s. i. When the pressure conduit 109 drops to 125 p. s. i., the spring 124 will have moved the piston 113 to the left as viewed in the drawing such that cam follower 122 is now in engagement with cam surface 119, and when follower 122 is in this position, the reset type micro-switch will be closed thereby energizing coil 79. Energization of coil 79 will again close the contacts of switch 89 causing energization of the motor 90 and operation of the pump 97. The pump 97 will continue to operate until the pressure existent in conduit 109 has reached a potential of 200 p. s. i.

Cam follower 121 is employed to open switch 81 in the event of a hydraulic failure. That is, after pressure existent in conduit 109 falls below 100 p. s. i., the piston 113 under the urge of spring 124 will be moved to the left as viewed in the drawing until follower 121 engages cam surface 118 at which time switch 81 will be opened. The existence of an operating pressure less the 100 p. s. i. in conduit 109 signifies a hydraulic failure, such as a leak or a pump or motor failure. When switch 81 is opened the pilot light 86 goes out thereby giving the pilot a visual indication of a hydraulic failure. The relay 88 is deenergized and the automatic system for operating the output arm 100 is rendered inoperative. Moreover, coil 125 is deenergized.

A conduit 126 also connects with conduit 101, the conduit 126 having connection with the inlet port of a failure positioner valve 127, and with the inlet port of the solenoid valve 73. The failure positioner valve 127 includes a valve casing 128 having outlet port connected by a conduit 129 to chamber 106 of the servomotor 103. Disposed within the valve casing 128 is a plunger 129a having a pair of lands cooperable with the inlet and outlet ports, and a projecting rod portion 130 passing through the coil 125 and having an abutment surface 131 cooperable with the detent armature 95. A spring 132 is employed to bias the plunger 129a in upward direction as viewed in the drawing. The rod of the piston 104 is connected to a porting sleeve 133 of the control valve 111. The porting sleeve 133 has an inlet port 134 and a pair of spaced outlet ports 135 and 136. The inlet port 134 is exposed to the inlet port 110 of the control valve 111 when the piston 104 is moved upwardly as viewed in the drawing under the urge of fluid pressure in chamber 106. The control valve 111 includes a valve guide 137 within which the porting sleeve 133 is movable. The valve guide 137 is formed with the inlet port 110 and a pair of spaced outlet ports 138 and 139 which are connected by conduits 140 and 141 respectively to an actuator 150. Disposed within the porting sleeve 133 is a valve plunger 142 having a pair of spaced lands cooperable with the outlet ports 135 and 136 of the porting sleeve. The plunger 142 is normally biased upwardly as viewed in the drawing by means of a spring 143 such that the end of plunger 142 having a roller 144 attached thereto is held in engagement with the surface of a cam 145. The cam 145 is operatively connected with the output arm 100 and moves angularly therewith.

The solenoid valve 73 includes a valve guide 146 having an inlet port connected to conduit 126 and a pair of outlet ports connected by conduits 147 and 148 to the actuator 150. Plunger 149 is disposed within the valve guide 146 for reciprocal movement in either direction under the control of solenoid windings 71 and 72. Associated with the ends of the plunger 149 are a pair of springs 151 and 152 and a pair of mechanical stops 153 and 154. The springs 151 and 152 normally position a plunger 149 in a neutral position wherein the plunger lands close the outlet ports as is shown in the drawing. Upon energization of solenoid coil 71, the plunger moves to the left into engagement with stop 153 thereby connecting the inlet port and the outlet port connected to conduit 147. At this time the port connected with conduit 148 is connected to the reservoir 96 through the valve guide 146 by any suitable conduit means, not shown. Conversely when solenoid coil 72 is energized, the plunger 149 moves to the right and into engagement with stop 154.

The actuator 150 includes a cylinder 155 within which a piston 156 is disposed for lineal movement in either direction under the urge of fluid pressure. The piston 156 has an axially extending rod portion 157 which projects through an end wall of the cylinder 155, and has formed thereon a toothed rack 158. The toothed rack 158 meshes with a pinion gear 159 which is rigidly connected to the output arm 100 and effects angular movement thereof upon lineal movement of the rack 158.

*Operation*

To initiate operation of the remote positioner, on-off switches 160 and 161 are closed whereupon the microswitch 77 will energize the relay 79 and the motor operated pump will begin charging the accumulator 112 until the pressure existent in conduit 109 reaches a potential of 200 p. s. i. whereupon the accumulator piston 113 will position the cam 116 to deenergize the motor operated pump. If the switch 85 is closed, the system will be conditioned for automatic operation, and if the switch 85 is opened, the system will be conditioned for manual operation. For the purposes of the present discussion, it will be assumed that switch 85 is closed. With switch 85 closed, relay 88 and coil 125 are energized and the pilot light 86 is on. It will further be assumed that switch 76 engages contact 91 and consequently is in the "as is" position. Energization of relay coil 88 will move the blades 69 and 70 to switch 60 to the position they are shown in the drawing. Moreover energization of coil 125 and coil 93 will position the valve plunger 129 in the position it is shown in the drawing. If the input arm 10 is now moved clockwise to adjust the position of member 11 of the potentiometer 12, the D. C. bridge 24 will be unbalanced. The unbalanced voltage caused by movement of the potentiometer member 11 will be amplified by vacuum tubes 27 and 28 and applied to the polarized relay 43. Accordingly, relay armature 46 will be moved into engagement with contact 48 and thus energizing solenoid winding 22. Energization of solenoid winding 72 will effect movement of plunger 149 to the right as viewed in the drawing whereupon fluid under pressure will be applied through the conduits 126 and 148 to chamber 162 of the actuator while chamber 163 of the actuator will be connected to the reservoir 96 through conduit 147 and the valve sleeve 146. Application of pressure to chamber 162 of the actuator will effect movement of the actuator piston 156 to the left as viewed in the drawing thereby effecting rotation of the pinion gear 159 in a clockwise direction and likewise effecting the clockwise movement of the output arm 100. Clockwise movement of the output arm 100 will effect movement of potentiometer member 21 so as to rebalance the D. C. bridge 24 when the movement selected by input arm 10 has been attained by the output arm 100. When the bridge 24 is balanced, no current flows between the output terminals 31 and 32 thereof and hence the relay 43 is deenergized and the armature 46 will be in the neutral position as is shown in the drawing. Thus solenoid coil 72 will be deenergized and the springs 151 and 152 will position the plunger 149 such as to trap fluid within the actuator cylinder 155 so as to lock the output arm 100 in the adjusted position. It should be noted at this time that when coil 125 is energized, the porting sleeve 133 remains in the position as shown in the drawing and hence fluid can neither be applied nor drained from the actuator cylinder through conduits 140 and 141.

If the switch 85 is opened, the automatic follow-up system is rendered inoperative in that relay 88 is deenergized and switch blades 69 and 70 will move into engagement with contacts 57 and 58. Assuming coil 93 remains energized by having switch 76 in the "as is" position, valve plunger 129 will remain in the position it is shown in the drawing by reason of the detent armature 95 engaging the abutment 131. Movement of the output arm 100 may now be effected by momentary manual actuation of the switch 62. If switch blades 59 and 61 of the switch 62 are moved into engagement with contacts 63 and 66 as shown in the drawing, solenoid coil 72 will be energized on the 28 volt D. C. power supply through wire 74, contact 66, switch blade 61, contact 58 and switch blade 70. This in turn will effect movement of the output arm in a clockwise direction. Conversely, the output arm may be moved in the counterclockwise direction as switch blades 59 and 61 are moved into engagement with contacts 64 and 65. With the switch 62 in the latter position, solenoid 71 will be energized from the 28 volt D. C. power supply through wire 74, contact 65, switch blade 59, contact 57 and switch blade 69.

Whenever the positional difference between the input and output arms 10 and 100 exceeds that encountered in normal operation, for instance 5°, the relay coil 44 becomes energized sufficiently through the resistor 45 to effect movement of the armature 49 into engagement with end contacts 50 and 51. Resistor 45 limits the current flow through polarized relay 44 so that during normal operation relay 44 is not energized sufficiently in either direction to actuate the armature. In other words, due to the rapidity at which the output arm 100 is moved upon movement of the input arm 10, the D. C. bridge is not unbalanced sufficiently to effect operation of the relay 44. In other words, the sensitivity of the automatic follow-up system is such that the positional difference between the input and output arms will be appreciably less than 5°. Hence, the occurrence of a positional difference of 5° between the input arm 10 and the output arm 100 indicates a malfunction in either the electrical control system or the hydraulic actuating system, and under these conditions the automatic follow-up system is rendered inoperative and the pilot operated manual system can be used to control the position of the output arm independent of the input arm. When armature 49 is in engagement with end contacts 50 or 51, the relay 68 is energized and switch 80 is moved to the open position. Movement of switch 80 to the open position results in the extinguishment of the pilot light 86 and the deenergization of relay 88 and coil 125. Deenergization of relay 88 moves the switch 60 from the automatic follow-up system to the pilot operated manual system. The output arm 100 and the actuator piston 156 are locked against movement by fluid trapped in the actuator cylinder at the position they have assumed upon the opening of switch 80. This position is otherwise referred to as the "as is" position. Accordingly, when the normal operating angular difference between the input and output arms is exceeded, the automatic follow-up system is rendered inoperative, but the manual system may be operated by the pilot by using the increase-decrease momentary contact switch 62. When the positional error between the input and the output arms has been reduced to the normal difference encountered in use, the automatic follow-up system is again rendered operative by the deenergization of relay 68. However, it is to be noted that the pilot may at all times manually adjust the position of the output arm independently of the input arm by opening switch 85, and operating the increase-decrease momentary contact switch 62.

When the pilot positions the failure switch 76 so that it is in engagement with contact 91 as is shown in the drawing, any electrical or hydraulic failure in the automatic remote positioner system will result in the output arm 100 being locked in the position it had attained when the particular failure occurred. This lock is again accomplished by trapping fluid in the actuator cylinder in that the plunger associated with the solenoid valve 73 and the control valve 111 are normally maintained in a port closing position. If an electrical power failure occurs with the failure positioner switch 76 in the "as is" position, the pilot may operate the increase-decrease momentary contact switch 62 and control the flow of fluid under pressure stored in the accumulator 112 to the actuator and effect movement of the output arm 100 independent of the input arm 10 to any desired position. Enough fluid under pressure is stored at all times in the accumulator to move the actuator piston through more than one complete stroke. If desired, an inching system could be employed to effect intermittent energization of solenoid windings 71 and 72 from an independent power source, not shown, in order that the pilot may be permitted to set the output arm 100 in a precise position.

If the failure positioner switch 76 is moved into engagement with contact 92, the pilot has selected in advance what is herein called a "predetermined" position failure. Under these conditions if a loss of fluid pressure occurs, it operates the emergency shut down switch 81, and if a loss of electrical power applied to solenoid coil 88 occurs, the following sequence of events will transpire. When the switch arm 76 engages contact 92, winding 94 is energized and the detent armature 95 is withdrawn from the path of abutment 131. Accordingly when power is removed from coil 88 it is likewise removed from coil 125, and the spring 132 will move the plunger 129a to a position where the inlet and outlet ports of valve casing 128 are in communication. Accordingly hydraulic fluid under pressure will flow from the accumulator 112 through conduits 109, 107 and 126 to the inlet port of valve casing 128, from whence it will flow through the outlet port of the valve casing to servo chamber 106. Due to the differential area exposed to this pressure in the servo motor 103 the piston 104 will be moved in an upward direction as viewed in the drawing until the porting sleeve 133 engages a stop 165 formed on the valve guide 137. When the porting sleeve 133 abuts the stop 165 formed on the valve guide, ports 110 and 134 are in communication as are ports 136 and 138, and 135 and 139. Accordingly, fluid under pressure is admitted from the accumulator through conduit 109 to conduit 141 and chamber 162 of the actuator, while chamber 163 of the actuator is connected to drain through conduit 140, ports 138 and 136 and the open ended valve guide 137. As the rack 158 rotates the pinion 159, the cam 145 will position the plunger 142 through the roller 144 until the "predetermined" position has been attained by the output arm 100 at which time the plunger 142 will move upwardly so that the lands thereof close ports 135 and 136 of the porting sleeve and the actuator 150 is hydraulically locked. A low slope on the cam 145 near the "predetermined" position, is utilized to minimize overshooting of the "predetermined" position and thus avoid a hunting condition. If the output arm 100 is employed to position an engine throttle, the "predetermined" position of the output arm may be that which adjusts the throttle to a cruise power position. In any event the "predetermined" position is attained when the roller 144 approaches the medial point of the cam slope. A spring loaded pin, not shown, may be employed to mechanically lock the output arm in place in the "predetermined" position should a failure occur when the failure selector switch 76 is conditioned for a "predetermined" position failure. The spring loaded pin, not shown, is actuated by the plunger 129a and is ineffective at all times except when the plunger 129a moves.

While the embodiment of the present invention as herein disclosed, constitutes a preferred form, it is to be understood that other forms might be adopted.

What is claimed is as follows:

1. A remote positioner including in combination, a manually positionable input member, an output member, an actuator operatively connected to said output member for effecting movement thereof, automatically controlled means connected with the input and output members for effecting operation of said actuator in response to movement of said input member to thereby effect a like movement of the output member, manually controlled means connected with said actuator capable of effecting actuator operation and movement of said output member independent of input member movement, and means operatively connected with said automatically controlled means capable of rendering said automatically controlled means inoperative upon the existence of a predetermined positional error between the input and output members.

2. A remote positioner including in combination, a manually positionable input member, an output member, an actuator operatively connected to said output member for effecting movement thereof, automatically controlled means connected with the input and output members for effecting operation of said actuator in response to movement of said input member to thereby effect a like movement of the output member, means operatively connected with said actuator to lock the output arm in the adjusted position, and means operatively connected with said automatically controlled means capable of rendering said automatically controlled means inoperative upon the existence of a predetermined positional error between the input and output members.

3. A remote positioner including in combination, a manually positionable input member, an output member, an actuator operatively connected to said output member for effecting movement thereof, automatically controlled means connected with the input and output members for effecting movement thereof, automatically controlled means connected with the input and output members for effecting operation of said actuator in response to movement of said input member to thereby effect a like movement of the output member, means operatively connected with said automatically controlled means capable of rendering said automatically controlled means inoperative upon the existence of a predetermined positional error between the input and output members, visual means connected with the automatically controlled means to indicate the operative or inoperative condition thereof, and manually operable means connected with said actuator for effecting operation thereof and movement of said output member independent of said input member.

4. A remote positioner including in combination, a manually positionable input member, an output member, an actuator operatively connected to said output member for effecting movement thereof, automatically controlled means connected with the input and output members for effecting operation of said actuator in response to movement of said input member to thereby effect a like movement of the output member, means operatively connected with said automatically controlled means capable of rendering said automatically controlled means inoperative upon the existence of a predetermined positional error between the existence of a predetermined positional error between the input and output members, and means connected with said actuator to lock the actuator and the output member in position upon failure of said automatically controlled means.

5. A remote positioner including in combination, a manually positionable input member, an output member, an actuator operatively connected to said output member for effecting movement thereof, automatically controlled means connected with the input and output members for effecting operation of said actuator in response to movement of said input member to thereby effect a like movement of the output member, means operatively connected with said automatically controlled means capable of rendering said automatically controlled means inoperative upon the existence of a predetermined positional error between the input and output members, visual means connected with the automatically controlled means to indicate the operative or inoperative condition thereof, and means connected with said actuator to lock the actuator and the output member in position upon failure of said automatically controlled means.

6. A remote positioner including in combination, a manually positionable input arm, an output arm, a fluid pressure operated actuator connected to the output arm for effecting movement thereof, a fluid pressure system for operating said actuator comprising a source of fluid pressure, a valve for controlling fluid flow from said source to said actuator, a conduit interconnecting said source and said valve and a pair of conduits interconnecting said valve and said actuator, automatically controlled means operatively interconnecting said input and output arms and said valve whereby movement of said input arm will position said valve to direct fluid under pressure to said actuator to effect a like movement of said output arm which will reposition said valve to interrupt the application of fluid under pressure to said actuator, manually operable means operatively connected with said valve for effecting movement thereof so that fluid under pressure will be directed to said actuator to effect movement of said output arm independent of said input arm, said fluid pressure system also including a second valve having connection with the source and the actuator for directing fluid under pressure to said actuator independent of said first recited valve, and means operatively connected with said second valve for effecting operation thereof, said last recited means comprising an electrical circuit having a failure selector switch, a pair of solenoid coils which may be individually energized by said switch, an armature magnetically associated with said solenoid coils and movable in opposite directions dependent upon which of the coils is energized and servo actuated means operatively connected with said second valve and controlled by the position of said armature for effecting actuation of said second valve.

7. The combination set forth in claim 6 including means operatively connected with said automatically controlled means for rendering said automatically controlled means inoperative and the manually operable means operative upon the existence of a predetermined positional error between the input and output members.

8. A remote positioner including in combination, a manually positionable input member, an output member, an actuator operatively interconnected to said output member for effecting movement thereof, automatically controlled means connected with the input and output members for effecting operation of said actuator in response to movement of said input member to thereby effect a like movement of said output member, first manually operable means operatively connected with said actuator for effecting operation thereof and movement of said output member independent of said input member, means operatively connected with said automatically controlled means capable of rendering said automatically controlled means inoperative upon the existence of a predetermined positional error between said input and output members and for rendering said first manually operable means operative, and second manually operable means operatively connected with said actuator for effecting operation thereof to move said output member to a predetermined position independent of said input member upon a failure in the remote positioner.

References Cited in the file of this patent

UNITED STATES PATENTS

| | | |
|---|---|---|
| 588,946 | Bergman | Aug. 31, 1897 |
| 1,075,733 | Simon | Oct. 14, 1913 |
| 1,375,269 | Akemann | Apr. 19, 1921 |
| 2,271,817 | Ernst | Feb. 3, 1942 |
| 2,330,739 | Piron | Sept. 28, 1943 |
| 2,373,226 | Coates | Apr. 10, 1945 |
| 2,398,421 | Frische | Apr. 16, 1946 |
| 2,413,907 | Brant | Jan. 7, 1947 |
| 2,426,695 | Kremiller | Sept. 2, 1947 |
| 2,445,343 | Tyra | July 20, 1948 |
| 2,511,393 | Worthington | June 13, 1950 |
| 2,515,495 | Curry | July 18, 1950 |
| 2,516,449 | Coates | July 25, 1950 |
| 2,566,633 | Rathmann | Sept. 4, 1951 |
| 2,602,611 | Glenny | July 8, 1952 |
| 2,641,969 | Roehm | June 16, 1953 |
| 2,674,232 | Mason | Apr. 6, 1954 |
| 2,678,177 | Chenery et al. | May 11, 1954 |